UNITED STATES PATENT OFFICE.

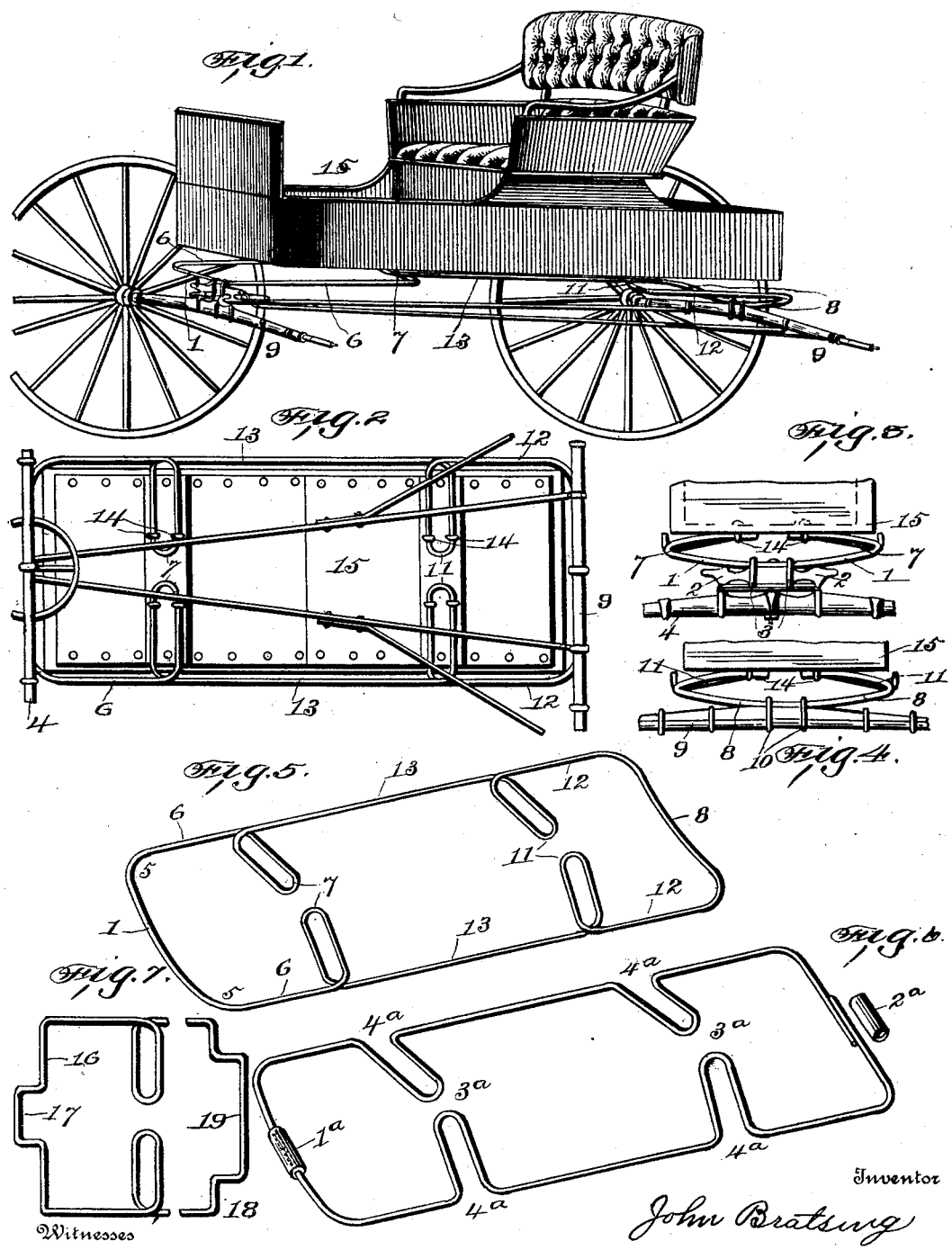

JOHN BRATSING, OF PHILADELPHIA, PENNSYLVANIA.

VEHICLE-SPRING.

SPECIFICATION forming part of Letters Patent No. 711,381, dated October 14, 1902.

Application filed July 10, 1902. Serial No. 115,064. (No model.)

*To all whom it may concern:*

Be it known that I, JOHN BRATSING, a citizen of the United States, residing at Philadelphia, in the county of Philadelphia and State of Pennsylvania, have invented certain new and useful Improvements in Vehicle-Springs, of which the following is a specification.

This invention relates to vehicle-springs, and particularly to a combined front, rear, and side spring of such novel and peculiar construction and arrangement that the ordinary front and end springs may be dispensed with, and the usual side-bars and their springs may not be employed.

The object of the invention is to provide a vehicle-spring reaching from the front to the rear axle and extending lengthwise the axles, with inwardly-turned cross-loops, upon which the vehicle-body is mounted, and to make the spring of one or more pieces from solid bar-steel, single or double tubing, or of suitable aluminium metal.

A further object of the invention is to provide a combined bottom, side, and end spring for vehicles, the said bottom springs being formed by inwardly and upwardly turned loops connected in pairs at their outer ends by the side spring. The rear end springs connect the rear loops, and the front end springs connect the front loops, so that the latter, the side springs, and the end springs are all formed in one and the same piece.

Torsion-springs secured to side-bars and having loops extending under the body of a vehicle and other such springs having loops controlled by coil-springs attached to the vehicle-body are well known to me; but besides the springs being loose or spring-controlled the ordinary or usual side-bars are employed, to which the ends of the springs are secured, and therefore substantially the same results are produced as in a common side-bar buggy or vehicle. It has been proposed to omit the end springs and side-bars and to substitute a combination torsion-spring and perch-pole or rods; but this arrangement does not remove many objections, and the results produced do not warrant such substitution.

It is therefore the purpose and intent of this invention to overcome existing disadvantages in side-bar vehicles, whether they be of the old and common type or of the many special forms and later designs and whether employing side bars and springs or end springs, and to furnish a spring device of simplicity and great durability which will support or carry a vehicle-body from the axle on a skeleton spring-frame constituting the only connection between the body and the running-gear and forming a cushion-bed or body-support of stability and great resiliency.

Other objects, advantages, and improved results accruing from the special construction and arrangement will be disclosed in the specification and set up in the claims to follow.

In the accompanying drawings, forming part of this application, Figure 1 is a perspective view of a buggy with wheels removed from one side and showing my invention applied. Fig. 2 is an inverted plan view, partly broken away. Fig. 3 is a front end view, partly broken away. Fig. 4 is a rear end view, partly broken away. Fig. 5 is a perspective view of the spring. Fig. 6 is a similar view of a modification. Fig. 7 is a perspective view of a modification, partly broken away.

The same reference-numerals denote the same parts throughout the several views of the drawings.

The vehicle herein shown is of the ordinary type of road-wagon or runabout without the usual side bars and springs; but my invention may be applied to other forms of buggies, road-wagons, &c. There are no changes made in the running-gear, except the omission of the said bars, the ordinary end springs, and the connections between the same and the body of the vehicle, so that in the application of my combination-spring various elements are dispensed with, making a lighter vehicle and reducing the cost thereof.

My spring consists, preferably, of a continuous single piece of spring metal, which may be solid, in pipe form, and double-tubed, and of steel, aluminium, or of any other character of material found best suitable for the purpose. Said spring comprises a front portion 1, slightly concaved, secured to the running-gear head 2 by suitable clips 3 and extending lengthwise the front axle 4 and terminating in right-angle bends 5 to form a front spring. From the bends or corners 5 is projected a forward side-spring portion 6, terminating in forward body elongated spring-loops 7, which project inwardly and upwardly toward each other, with an interval or space between the ends of the loops. The rear-spring portion 8 has a curvature similar to the front portion 1 and is secured to the rear axle 9 by suitable clips 10 and with the rear elongated loops 11, and side-spring portions 12 is a duplication of the front part just described. The front and rear loops are connected together in pairs by spring side pieces 13, which extend lengthwise the vehicle-body and with the said portions 6 and 12 form a continuous side-spring bar lengthwise the vehicle-body, so that the latter has a longitudinal spring-support from one axle to the other, and the front and rear pieces 6 and 12, respectively, afford a spring connection between the said pieces 13 and the axles. The ends of the spring-loops are secured in pairs by clips 14 to the vehicle-body 15, and owing to the upward inclination of the loop ends the said body is held elevated and clear of the spring portions 6 and 12, and thereby is formed a cushion-seat of great resiliency and elasticity, but not too much so, for if the said body should be heavily loaded the weight will be distributed upon the said end-spring portions and the elasticity will be lessened or stiffened.

Referring to the modification shown in Fig. 6, the spring is made in two parts, which are connected by sleeves 1$^a$ and 2$^a$, and the loops 3$^a$ do not overlap each other, as in the preferred form, but have open outer ends 4$^a$.

Referring to the modification shown in Fig. 7, the general shape is the same as that of the preferred form, except the front portion 16 has an outwardly-projecting central loop 17 for attaching to a head-block and the rear portion 18 has an offset 19 to be secured to the rear axle or bolster, so that the loop 17 and the offset 19 are the only visible parts of the spring when viewed from the top of the vehicle-body, thus giving a neat and compact appearance to the vehicle.

It is obvious that a shorter coupling, affording means for shorter turns in the running-gear without injury to the spring device, is attainable and that in addition to the simple and ready application of the device much time and labor are saved in the absence of special adjustments, connections, and cost of material.

I do not wish to be understood as limiting myself to any particular material, size, or means of affixing the spring device, nor to the number, location, or inclination of the spring-loops.

Having thus described my invention, what I claim as new, and desire to secure by Letters Patent, is—

1. A combination side, end, and bottom vehicle-spring having inwardly-projecting loops arranged in pairs crosswise opposite each other and to which the vehicle-body is attached, said loops being connected by the side and end portions which latter are secured respectively to the vehicle-axles.

2. A vehicle-spring comprising front and rear portions adapted to be attached respectively to the front and rear vehicle-axles, and terminating in inwardly-turned elongated loops, secured to the vehicle-body, and the side portion connecting the loops together in pairs.

3. A vehicle-spring comprising front and rear portions adapted to be secured respectively to the front and rear vehicle-axles, a portion at right angles to said portions, side portions reaching from one to the other of the right-angle portions, and inwardly-turned loops at the intersection of the side portions and the right-angle portions.

4. A vehicle-spring having side and end pieces terminating in open end loops extending inwardly at right angles from the side pieces opposite each other in pairs with an interval between the loops of each pair and a space between each pair of loops.

5. A vehicle-spring having side pieces terminating in loops extending at right angles from the side pieces in pairs, one pair of the loops pointing in the opposite direction to the other pair with an interval between the loops of each pair and a space between each pair of loops.

6. In a vehicle-spring the combination of the side pieces having elongated inturned loops open at the juncture of the loops and said pieces so as to form a space between portions of the side pieces, and the end pieces connecting the side pieces to form a space between the loops of each side piece and an interval between the two sets of loops.

In witness whereof I hereunto set my hand in the presence of two witnesses.

JOHN BRATSING.

Witnesses:
  GEO. NEBEKER,
  JOS. H. CARTER.